United States Patent Office 3,506,450
Patented Apr. 14, 1970

3,506,450
PHOTOGRAPHIC MATERIAL FOR THE SILVER-DYE-BLEACH PROCESS
Horst Nickel and Fritz Suckfüll, Leverkusen, Bernhard Seidel, Cologne-Mulheim, and Erich Böckly, Leverkusen, Germany, assignors to Agfa-Gevaert Aktiengesellschaft, Leverkusen, Germany, a corporation of Germany
No Drawing. Filed June 13, 1966, Ser. No. 556,848
Claims priority, application Germany, July 1, 1965, A 49,620
Int. Cl. G03c 1/10
U.S. Cl. 96—99
5 Claims

ABSTRACT OF THE DISCLOSURE

Silver-dye-bleach photographic material in which the dye is a sulfonated amino naphthol azo dye.

This invention relates to photographic materials for the silver-dye-bleach process, which are characterized by containing a particularly light-fast magenta azo dye.

It is known that color photographic images can be produced by the silver-dye-bleach process, wherein a dye, usually an azo dye, is bleached in a homogeneously dyed colloid layer in accordance with a silver image which had been produced photographically.

According to this process, it is possible to produce both negatives and reversal images. If it is desired to produce positive paper prints or duplicate positives from diapositives, the silver image is produced by means of a simple black-and-white development, this silver image representing a negative of the copying original. Since the image dye which is homogeneously distributed in the layer (or in the 3 layers of a multicolor material) is bleached proportionately to the silver image, a dye image is obtained which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original, that is to say a positive color image is formed if the original is a negative color image.

The standards set as regards dyes for the process described are particularly high, since these dyes must be spectrally suitable, and should also be easily bleachable and fast to light. Furthermore, they must not detrimentally affect the photographic emulsion and must be completely resistant to diffusion in the gelatin, which is almost exclusively used as layer former. It is particularly important to have a high degree of fastness to light, and resistance to acid gases, such as occur, for example, in the industrial atmospheres.

It is among the objects of the present invention to provide new magenta azo dyes which are particularly suitable for use in the silver-dye-bleach process.

The above object has been attained by providing magenta dyes of the following formula:

I 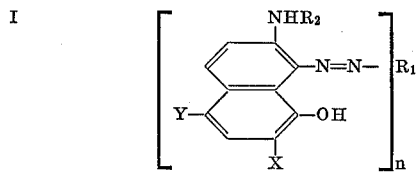

wherein $R_1$=an $n$-valent aromatic or quasi-aromatic radical, this radical containing at least $n$ aromatic rings, which are linked to the azo group and which preferably can be further substituted, it being possible for the radical $R_1$ to contain additional groupings with azo bonds;
$n$=1 to 4, preferably 1 or 2;
$R_2$=H, alkyl, preferably with up to 3 carbon atoms, it being possible for the alkyl radical to be substituted, preferably with hydroxyl or alkoxy groups, the latter having preferably up to 3 carbon atoms;
X=H or a sulfonic acid group;
Y=a sulfonic acid or a sulfonamide group which may be substituted by aliphatic groups, such as alkyl, having preferably up to 6 C-atoms, which may be substituted, for example, with hydroxyl or alkoxy groups containing preferably up to 3 carbon atoms, or aromatic groups, such as phenyl, it being possible for the phenyl ring to be substituted.

Dyes in which Y represents H are in general, less brilliant and fast to light than the dyes in which it represents a sulfo or sulfonamide group.

According to the number of the naphthalene nuclei which are substituted as indicated and thus according to the value of the number $n$, the molecule contains at least 1–4 sulfonic acid groups. In order to obtain a sufficient solubility in aqueous media when X=H, it is advantageous to introduce one or more other solubilizing groups, such as sulfonic acid, sulfone, sulfonamide or carboxylic acid groupings in the groupings $R_1$ or $R_2$.

The dyes according to the invention can be modified in many different ways, in particular by modification of the substituent $R_1$.

Particularly valuable are those dyes in which $R_1$ represents the radical of a diazo component of the benzene or naphthalene series, such as phenyl, diphenyl or naphthyl.

These radicals in turn may be substituted, for example, with alkyl or alkoxy groups, halogen atoms such as chlorine or bromine, sulfonic acid or carboxyl groups. Especially suitable are compounds which again contain azo compounds of the type indicated in Formula I, attached by way of acylamino groups. The aforementioned compounds correspond to the formulae:

II 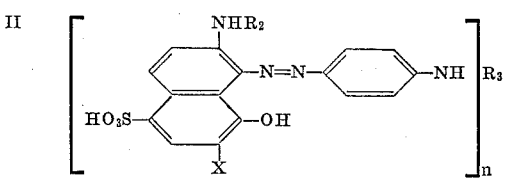

III 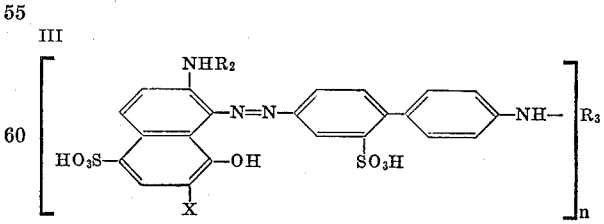

IV 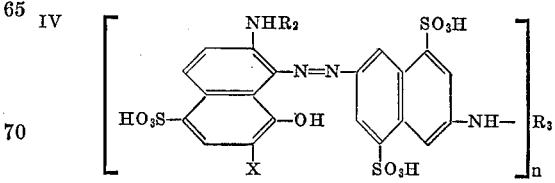

in which $R_3$ represents an n-valent aromatic, quasi-aromatic or aliphatic acyl radical or aminoacyl radical, preferably acyl radicals which are derived from aliphatic or aromatic dicarboxylic acids, for example, the following:

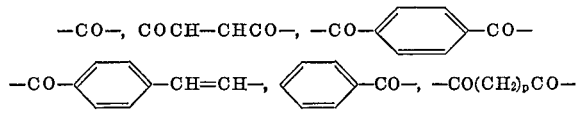

in which $p=0-8$ and preferably 2–4, and $n$ is 1 or 2. $R_3$ may also represent a triazinyl radical, such as

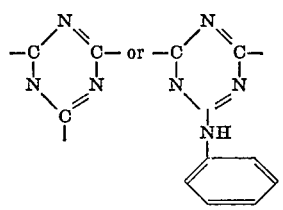

The radical $R_1$ can also be a benzene ring which carries in conjugation thereto a heterocyclic system, e.g., an imidazol ring, two benzene rings being joined to the 4,5-positions, of the imidazole ring, the second benzene ring being linked to another 2-amino-8-hydroxynaphthalene-5-sulfonic acid by way of another azo group as shown by the following Formula V:

V

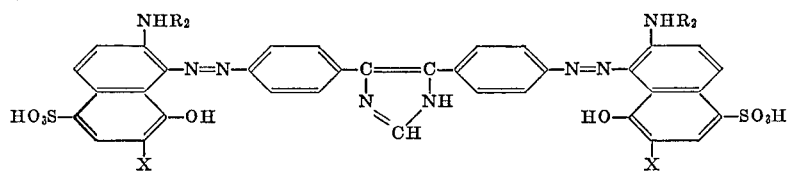

Groupings of the benzene or diphenyl series linked to the azo group are preferred, and these rings in turn can be substituted by acid groups, for instance sulfo, or by one or more acylamino or urea groupings. A sulfo group can thus be substituted on the benzene ring of Formula II, ortho to the azo group. The sulfo groups on the diphenyl and naphthalene rings linked to the NH in Formulae III and IV can also be replaced by hydrogen.

In bis-azo or poly-azo dyes, the color yielding components of the molecule can be linked either through an urea grouping or through the radical of an aromatic or aliphatic dicarboxylic acid or a cyanuric acid radical, as for example, in the following Formula VI:

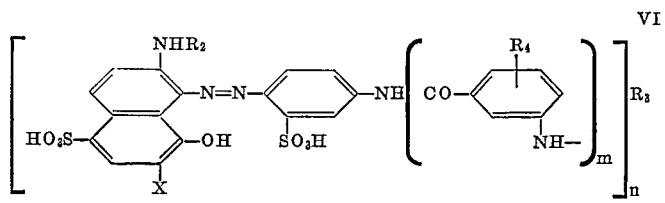

in which:

$m=0$, 1 or 2, $R_1$, $R_3$, $n$ and X are as defined above, and $R_4=$any arbitrary substituent, preferably H, alkyl, with preferably up to 3 carbon atoms, hydroxyalkyl with preferably up to 3 carbon atoms, alkoxy, with preferably up to 3 carbon atoms, alkoxyalkyl, each alkyl group preferably containing up to 3 carbon atoms, alkoxyalkoxy, each alkyl group containing up to 3 carbon atoms, halogen, such as chlorine or bromine, or acylamino.

One particular advantage of the dyes according to the invention is that they are fast to diffusion without any further processing, such as mordanting.

The following dyestuffs have proved to be especially suitable:

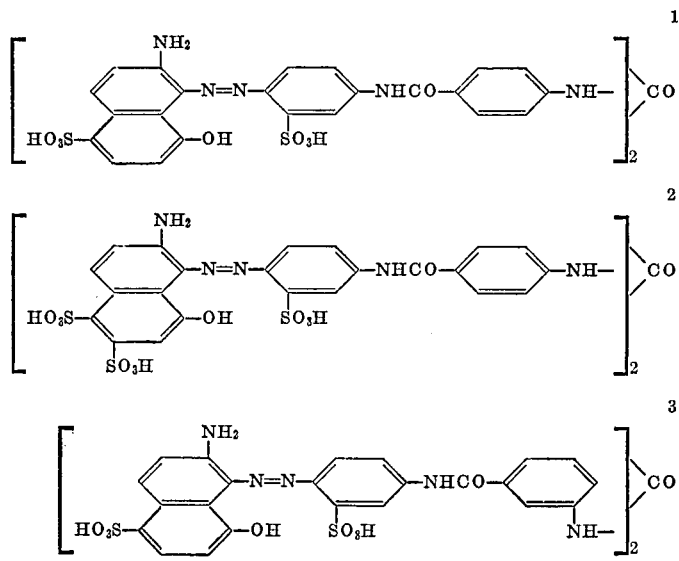

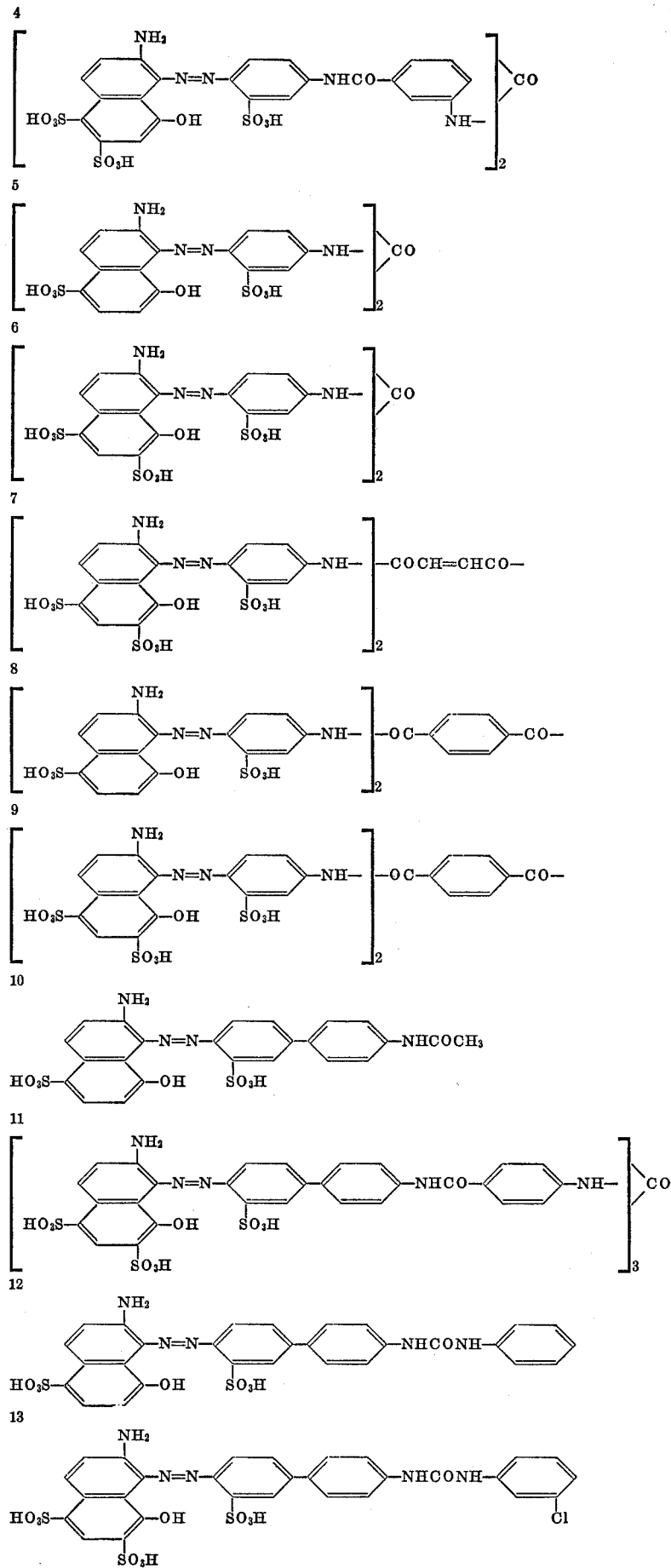

14 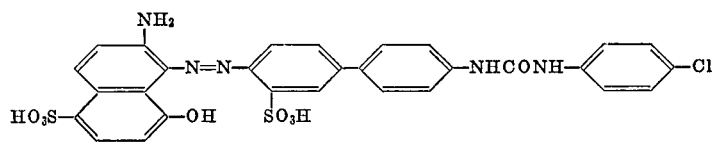
15 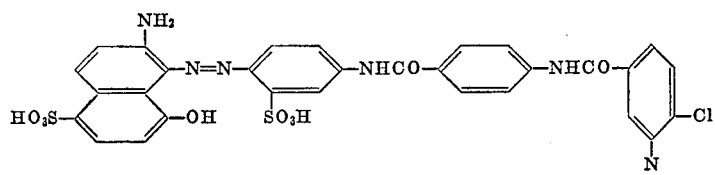
16 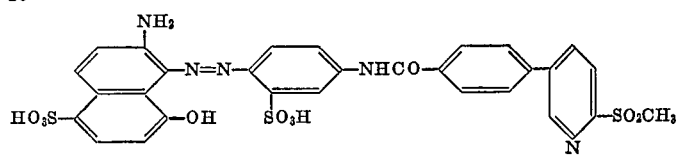
17 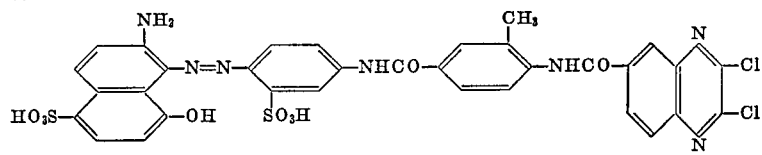
18 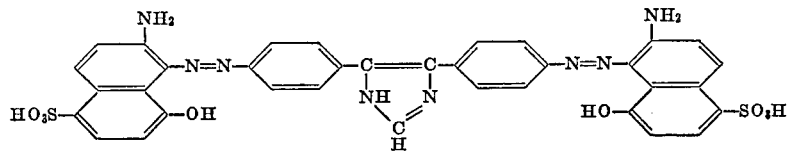
19 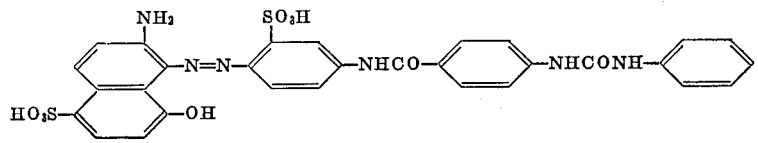
20 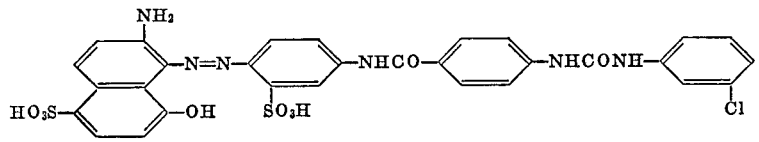
21 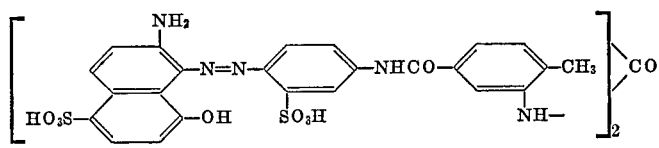
22 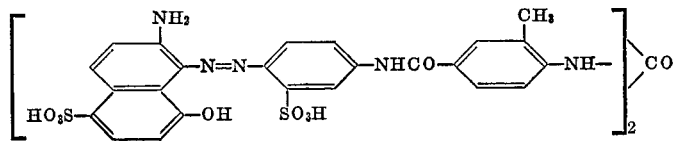

23 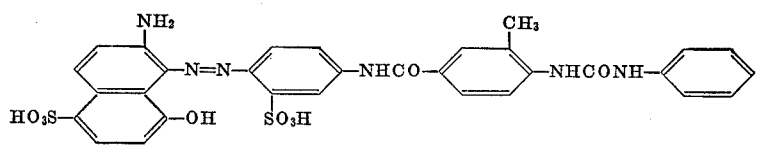
24 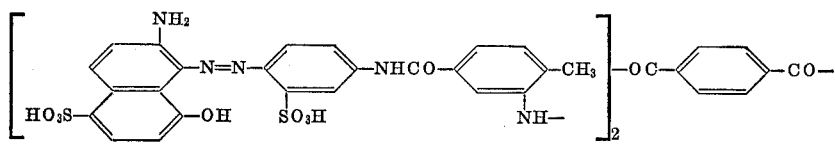
25 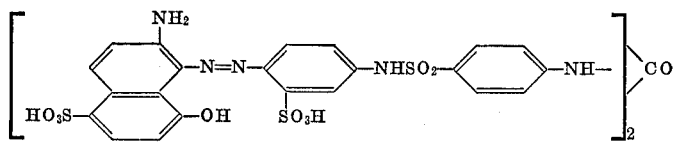
26 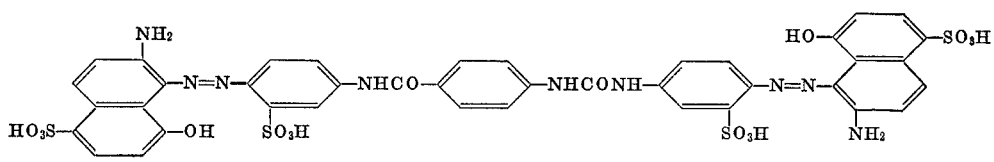
27 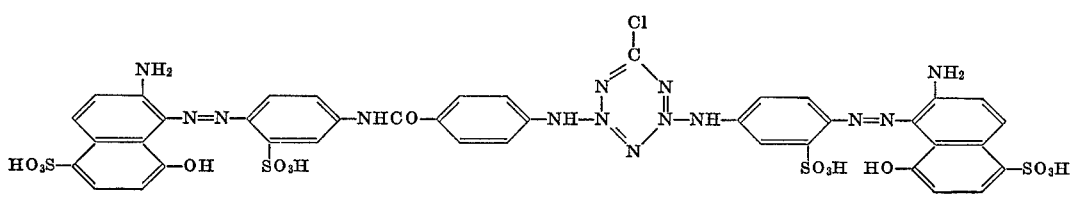
28 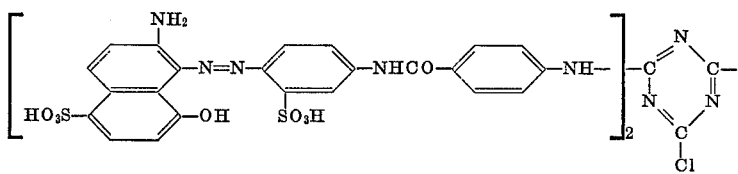
29 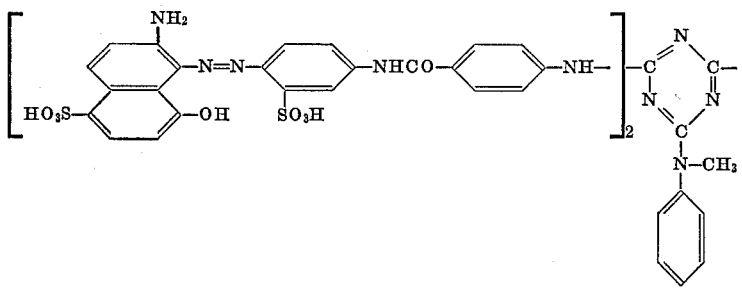
30 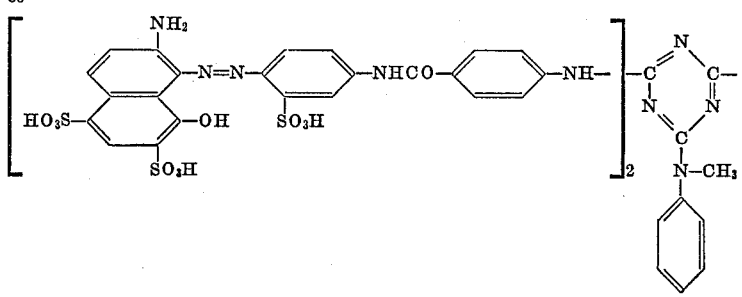

31
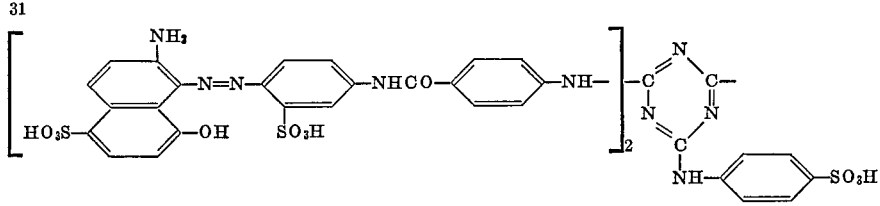

32
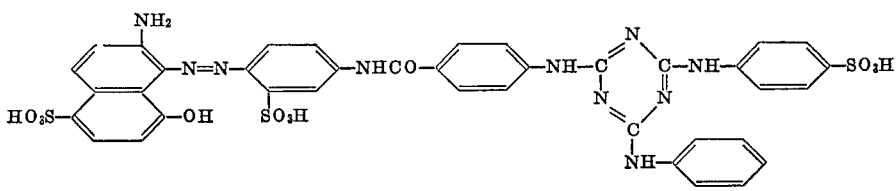

33
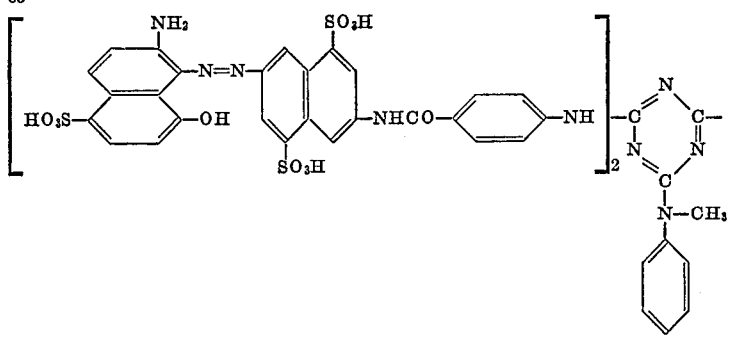

The dyes according to the invention can be prepared by the methods usual in azo dye chemistry. For example, dye 1 can be obtained by coupling the diazotized amino compound of the formula:

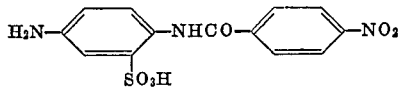

in an acid medium of 2 - amino-8-hydroxynaphthalene-5-sulfonic acid, the preparation of which is disclosed in French Patent No. 237,872, reduction of the nitro group of the dye formed to the aminoazo dyestuff by methods known per se in azo chemistry, followed by phosgenation to the urea derivative. The other dyes listed are prepared in an analogous manner.

On account of their excellent properties, the dyes according to the invention can be applied in color photographic layers for the silver-dye-bleach process in various ways. As will be seen from the following examples, they are preferably employed as image dyes in layers which are subjected to a simple black-and-white development and consequently form in the subsequent dye bleaching bath a direct positive dye image. However, it is also possible to carry out a black-and-white reversal development, whereby after treatment with common dye-bleaching baths, dye images with a gradation opposite to the original are obtained.

The dyes are substantially inert to agents customarily added to photographic layers, such as stabilizers, sensitizing dyes, chemical sensitizers, plasticizers, wetting agents, hardeners and the like.

As shown in the following example, they can be bleached out to pure whites in different types of bleaching baths, such as those which are based on quinoline and iodide, as described in U.S. Patent No. 2,629,658 (Example 29) or thiourea (as indicated in British Patent No. 507,211) and with different bleaching catalysts, such as quinoxalines or phenazine derivatives.

They can be applied onto any suitable supports, such as glass, baryta-coated papers, papers of all types which have been made water repellent, such as polyethylene-coated papers, cellulose acetate or polyesters and polycarbonate films and pigmented cellulose acetate films.

The image whites are also not discolored by exposure to light over long periods.

EXAMPLE 1

250 ml. of a 2% gelatin solution containing 2.0 g. of dye 1 and 0.35 g. of saponin are added to 500 ml. of a silver bromide gelatin emulsion which contains about 3 mol percent of silver iodide. The emulsion is sensitized for green light with a sensitizer such as that described in French Patent No. 1,428,104, Example 2, and is cast onto supports one of baryta-coated paper and one of cellulose triacetate. The silver coating is about 0.75 g. of silver per square meter. After drying, 2 test strips of the material produced as described are exposed behind a grey test wedge to yellow light or white light and processed as follows:

(1) Development for 5 minutes in a solution of 1 g. of p-methylaminophenol, 13 g. of anhydrous sodium sulfite, 3 g. of hydroquinone, 26 g. of anhydrous soda, 1 g. of potassium bromide in 1000 ml. of water.

(2) Rinsing for 1 minute.

(3) Fixing for 5 minutes in a solution of 200 g. of crystalline sodium thiosulfate, 20 g. of potassium metabisulfite in 1000 ml. of water.

(4) Rinsing for 5 minutes.

(5) Hardening for 5 minutes in a solution of 60 ml. of formalin (30%) and 15 g. of sodium bicarbonate in 1000 ml. of water.

(6) Rinsing for 5 minutes.

(7) Dye-bleaching for 15 minutes in a solution of 10 g. of potassium iodide, 10 g. of sodium hypophosphite, 25 ml. of concentrated sulfuric acid, 50 ml. of quinoline, 10 g. of 2,3-dimethylquinoxaline in 1000 ml. of water.

(8) Rinsing for 5 minutes.

(9) Bleaching for 5 minutes in a bath of 25 g. of copper chloride and 5 ml. of concentrated hydrochloric acid in 1000 ml. of water.

(10) Fixing for 10 minutes, as under 2.

(11) Final rinsing for 20 minutes.

After drying, two diffusion-resistant magenta-colored dye images of the test wedge are obtained with satisfactory whites on a transparent and reflecting support, the color of which is not changed even with relatively long exposure to day-light. The light fastness thereof is superior to that of similar prior art dyes.

The following layers are successively cast onto a baryta-coated paper:

(1) A red-sensitized layer, which contains per 500 g. of a silver bromide gelatin emulsion containing about 2 mol percent of silver iodide, 12 mg. of the sensitizer described in Example 11 of German Patent No. 1,177,481, and 2.3 g. of the dye:

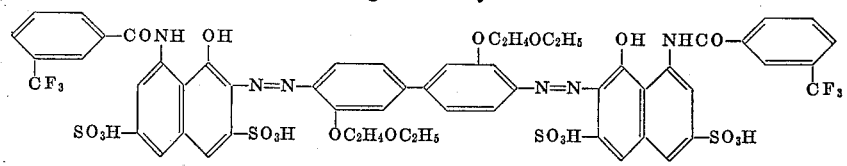

EXAMPLE 2

The procedure is as indicated in Example 1, but the emulsion is applied onto a white-pigmented cellulose acetate. After exposure to light and processing in the baths 1–6, as in Example 1, the subsequent procedure is as follows:

(7) Dye-bleaching for 5 minutes in a solution of 28 g. of thiourea, 18 g. of potassium bromide, 3 mg. of 2-amino-3-hydroxyphenazine and 400 ml. of concentrated hydrochloric acid in 1000 ml. of water.

(8) Rinsing for 5 minutes.

(9) Bleach-fixing for 10 minutes in a solution of 26 g. of tetrasodium-ethylenediamine-tetraacetate, 24 g. of anhydrous soda, 15 g. of ferric chloride, 13 g. of anhydrous soda, 15 g. of ferric chloride, 13 g. of anhydrous sodium sulfite and 200 g. of crystallized thiosulfate in 800 ml. of water.

(prepared according to German Patent No. 1,041,355) dissolved in 250 ml. of a 2% gelatin solution containing 25 ml. of a 30% aqueous solution of formaldehyde as hardener and 0.4 g. of saponin. The final layer contains 0.8 g. of silver in the form of silver halide per square meter.

(2) An intermediate layer of 3.5% gelatin solution.

(3) A green sensitized layer, as indicated in Example 1.

(4) An intermediate layer of a 3.5% gelatin solution.

(5) A yellow filter layer (optical density of 0.5 with 1 mm. layer thickness) consisting of a 2% gelatin solution containing colloidal silver.

(6) An intermediate layer of a 2% gelatin solution.

(7) An unsensitized silver bromide gelatin emulsion layer which contains per 500 g. of emulsion, 3 g. of the yellow dye of formula:

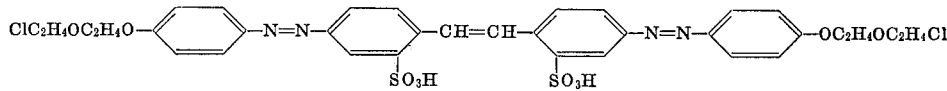

(10) Final rinsing for 20 minutes.

After drying, a similar result as in Example 1 is obtained.

EXAMPLE 3

The procedure followed is that described in Example 1, with the exception that the dye 1 is replaced by 2.5 g. of dye 18. After exposure to light and processing as in Example 1, similar results are obtained.

EXAMPLE 4

The procedure followed is that described in Example 2, with the exception that dye 1 is replaced with one of the dyes 3, 5, 8, 12 or any other desired dyes from those which are listed in the table.

EXAMPLE 5

The procedure followed is that described in Example 2, but after exposure it is processed as follows:

(1) Development for 5 minutes in a bath, as indicated in Example 1.

(2) Rinsing for 1 minute.

(3) Bleaching for 1 minute in a solution of 10 g. of potassium dichromate, and 5 g. of concentrated sulfuric acid in 800 ml. of water.

(4) Rinsing for 1 minute.

(5) Clarifying for 1 minute in a bath of 5 g. of anhydrous sodium sulfite in 1000 ml. of water.

(6) Rinsing for 1 minute.

(7) Second uniform exposure for 2½ minutes with a 40 watt lamp at a distance of 20 cm.

(8) Second development as under 1.

(9) Hardening and further processing as in Example 1, using the baths 5–11.

A magenta dye wedge is obtained which has a gradation opposite to that of the original.

EXAMPLE 6

A color-photographic multi-layer material for the silver-dye-bleach process is prepared as follows:

(described in Example 1 of German Patent No. 935,565) and which is mordanted with 2 g. of diphenyl-4, 4'-dibiguanide in order to increase the diffusion resistance of the dye. The final layer contains 0.7 g. of silver in the form of silver bromide per square meter.

(8) A protective layer of a 2.5% gelatin solution.

After drying, the material is exposed behind a multicolor transparent original and processed as described in Example 1, with the exception that 50–100 mg. of 2,3-dimethyl-quinoxaline are added to the bleaching bath and the processing period is increased to 25 minutes.

A reproduction of the original in true colors is obtained.

What is claimed is:

1. Light-sensitive photographic material with at least one silver halide emulsion layer container an azo dye of the following formula:

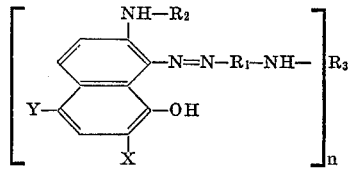

wherein represents:

$R_1$=a radical of the benzene or naphthalene series (containing at least n-benzene rings linked to the azo group);

$n$=1–2;

$R_2$=H or alkyl;

$R_3$=a radical having n-acyl groups;

X=H or a sulfonic acid group;

Y=sulfonic acid or a sulfonamide group.

2. Light-sensitive photographic material according to claim 1 wherein Y represents sulfonic acid and X and $R_2$ represent hydrogen.

3. Light-sensitive photographic material according to claim 1 wherein X and Y represent sulfonic acid groups and $R_2$ represents hydrogen.

4. A light-sensitive photographic material with at least one silver halide emulsion layer containing an azo dye of the following formula

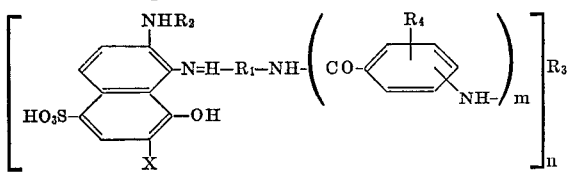

wherein represents:

$R_1 =$

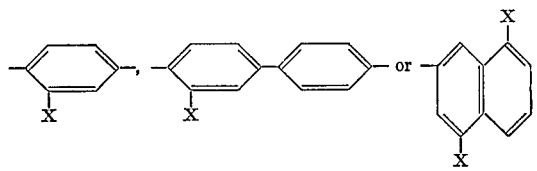

$X = H$ or sulfo
$R_2 = H$ or alkyl
$R_3 =$ a radical having n-acyl groups
$R_4 = H$, alkyl, oxyalkyl, alkoxy, alkoxyalkyl, alkoxyalkoxy, halogen or acylamino
$m = 0$, 1 or 2
$n = 1-2$.

5. A light-sensitive photographic material as defined in claim 4, wherein $n$ stands for 2 and $R_3$ represents a diacyl radical of an aliphatic acid having up to 8 carbon atoms, a benzene dicarboxylic di-acid or a triazinyl radical.

References Cited

UNITED STATES PATENTS 3,211,554  10/1965  Dreyfuss _____ 96—99

J. TRAVIS BROWN, Primary Examiner

U.S. Cl. X.R.

96—20, 53